(12) United States Patent  
Ito

(10) Patent No.: US 7,745,749 B2  
(45) Date of Patent: Jun. 29, 2010

(54) DIAL CONTROLLER

(75) Inventor: Masahiro Ito, Ichinomiya (JP)

(73) Assignee: Denso Corporation, Kariya (JP)

( * ) Notice: Subject to any disclaimer, the term of this patent is extended or adjusted under 35 U.S.C. 154(b) by 845 days.

(21) Appl. No.: 11/639,335

(22) Filed: Dec. 15, 2006

(65) Prior Publication Data

US 2007/0140454 A1      Jun. 21, 2007

(30) Foreign Application Priority Data

Dec. 21, 2005      (JP)      ............................ 2005-368006

(51) Int. Cl.
*H01H 19/00*      (2006.01)

(52) U.S. Cl. ........................... 200/336; 200/4; 200/564; 200/568; 200/572; 200/316

(58) Field of Classification Search ...................... 200/4, 200/6 R, 11 R, 14, 5 R, 17 R, 564–568, 572–574, 200/336; 341/35; 345/184
See application file for complete search history.

(56) References Cited

U.S. PATENT DOCUMENTS

| | | | |
|---|---|---|---|
| 4,000,382 A * | 12/1976 | Kolb ............................. 200/4 |
| 4,052,582 A * | 10/1977 | Mullen et al. ............... 200/330 |
| 4,263,486 A | 4/1981 | Taylor |
| 6,262,378 B1 * | 7/2001 | Chou ............................ 200/4 |
| 6,797,907 B1 * | 9/2004 | Meagher et al. ............. 200/564 |
| 6,927,348 B1 * | 8/2005 | Schmidt et al. ............. 200/5 R |
| 7,067,744 B2 * | 6/2006 | Mere et al. ...................... 200/4 |
| 7,238,904 B2 * | 7/2007 | Ogawa et al. ............... 200/336 |
| 7,462,795 B2 * | 12/2008 | Montalvo .................... 200/336 |

FOREIGN PATENT DOCUMENTS

| JP | 09-223607 | 8/1997 |
|---|---|---|
| JP | 11-273506 | 10/1999 |
| JP | 2000-067696 | 3/2000 |
| JP | 2000-260248 | 9/2000 |
| JP | 2001-184969 | 7/2001 |

OTHER PUBLICATIONS

Chinese Office Action dated Jul. 3, 2009, issued in corresponding Chinese Application No. 200610172452.3, with English translation.

* cited by examiner

*Primary Examiner*—Michael A Friedhofer
(74) *Attorney, Agent, or Firm*—Nixon & Vanderhye PC

(57) ABSTRACT

A dial controller includes a dial, a displacement converter for converting a rotational displacement caused by a rotation operation of the dial to an axial displacement of the dial along a rotation axis of the dial, and a displacement detector for detecting and outputting information on a rotation angle of the dial based on a detection result of the axial displacement of the dial.

19 Claims, 12 Drawing Sheets

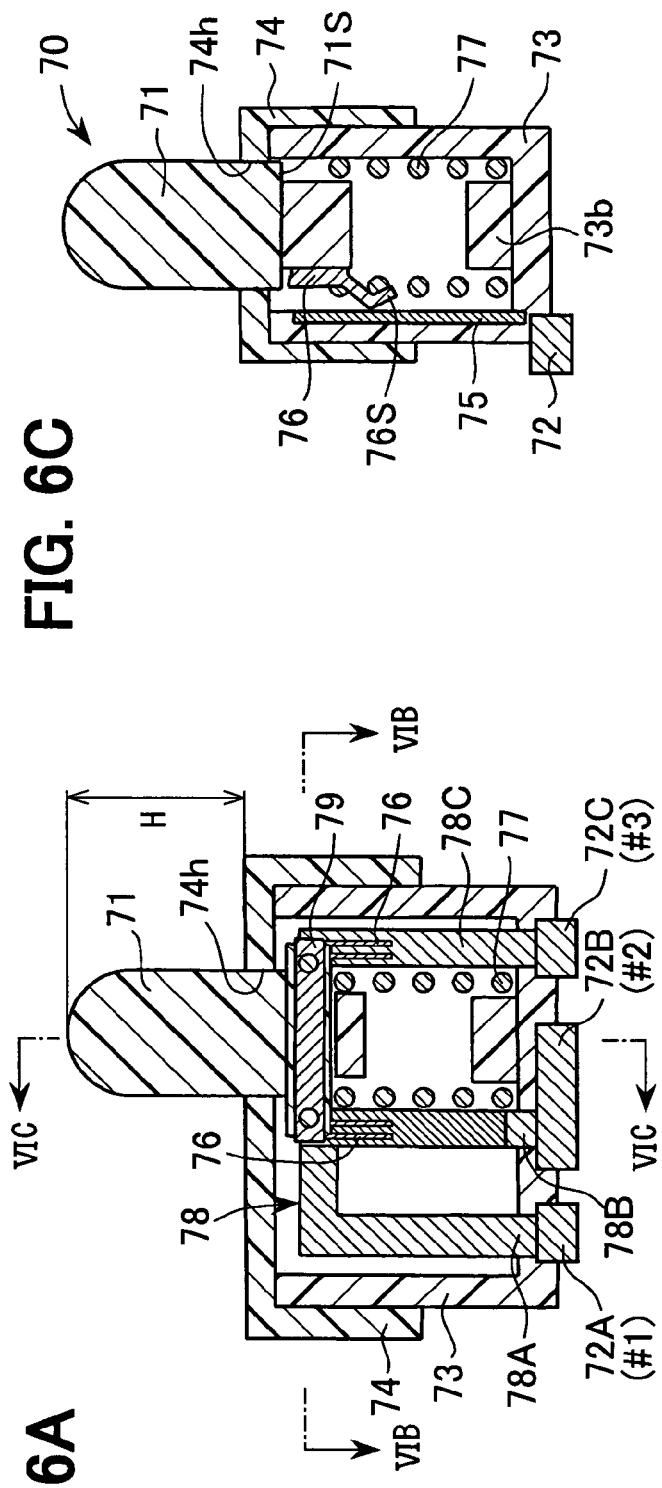
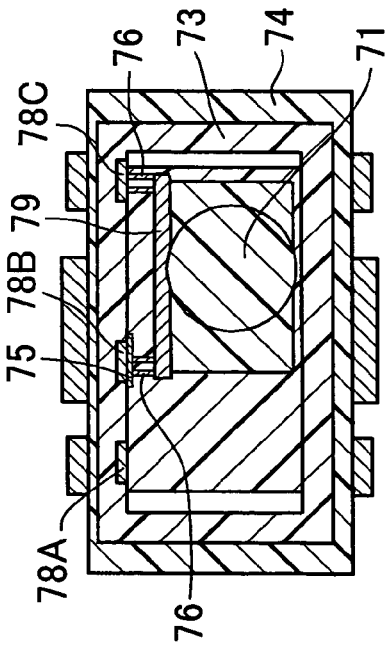
FIG. 6A
FIG. 6B
FIG. 6C

DIAL CONTROLLER

CROSS REFERENCE TO RELATED APPLICATION

This application is based on and claims the benefit of priority of Japanese Patent Application No. 2005-368006 filed on Dec. 21, 2005, the disclosure of which is incorporated herein by reference.

FIELD OF THE INVENTION

The present invention generally relates to a controller for use in a vehicle.

BACKGROUND OF THE INVENTION

In recent years, various vehicular systems and devices such as an air-conditioner, a car audio system, a navigation system and the like are controlled by using an operation control unit. The operation control unit has an operation unit that is operated by a user, i.e., an occupant of a vehicle, for inputting various inputs for controlling those devices. The operation part of the air-conditioner for controlling an air amount, air temperature, or air-outlet positions, the operation part of the car audio system for controlling sound volume, or the like is, among other operation parts, provided as a dial controller (Refer to Japanese patent documents JP-A-H11-273506, JP-A-2000-67696, and JP-A-2001-184969).

The dial controller described in each of the above documents includes a supplemental devices such as a push switch, an LED indicator or the like in a center portion of an operation dial, where a rotation axis of the operation dial is located. The operation dials are usually arranged in a row on an instrument panel, and an interference between the supplemental devices of the two or more adjacent operation dials is prevented by having a rotation detection unit of the operation dial at an outer periphery of each operation dial. According to the description of the patent document JP-A-H11-273506, a rotation angle of the operation dial is detected by having a variable resistor that has a carbon film resistor printed on a substrate along the periphery of the operation dial. According to the description of the patent documents JP-A-2000-67696 and JP-A-2001-184969, a rotational movement of the operation dial is transferred to a rotary variable resistor by associating a small gear on a shaft of the variable resistor with a large gear on an outer circumference of the operation dial.

However, the structure of the operation dial disclosed in the patent document JP-A-H11-273506 requires a large arc shape carbon film resistor printed on the substrate that fittingly formed to be disposed on the instrument panel, which leads to an increased production cost of the substrate. In addition, an additional space for having the carbon film resistor consumes a limited space on the substrate, thereby reducing an installation space of other circuit elements and leading to a deteriorated space efficiency of the substrate. On the other hand, the disclosure in the patent documents JP-A-2000-67696 and JP-A-2001-184969 proposes the structure that requires the rotary variable resistor or the small gear that occupies a large planar space disposed at a position outside of the operation dial, thereby imposing restriction on the size and/or the design that arises from an increased planar space as a background space of the operation dial on the instrument panel. Furthermore, the increase of the background space of the operation dial is problematic when the plural operation dials need to be positioned in an area within a required distance for having the small gear or the like.

SUMMARY OF THE INVENTION

In view of the above-described and other problems, the present disclosure provides a dial controller that has a small volume with a fewer requirements on a design aspect.

In one aspect of the present disclosure, the dial controller includes a dial, a displacement converter for converting a rotational displacement caused by a rotation operation of the dial to an axial displacement of the dial along a rotation axis of the dial, and a displacement detector for detecting and outputting information on a rotation angle of the dial based on a detection result of the axial displacement of the dial. The dial controller having the above structure detects the displacement in the axial direction of the dial, thereby demanding a small space for the displacement detection mechanism. This leads to a smaller installation space for the controller and, as a result, the dial controller in a smaller volume has a fewer restrictions on the design and a greater adaptability to the modification.

In another aspect of the present disclosure, the dial controller provides a greater advantage by having a supplemental device in a body of the controller. In this manner, the supplemental device does not interfere with the displacement detection mechanism. In addition, the controller itself requires a smaller installation space for an improvement of arrangement flexibility or the like.

In yet another aspect of the present disclosure, the body of the dial controller is disposed on a case, and the displacement indicator is disposed on a case side of the body. In this manner, the dial controller having plural selection positions requires a smaller installation space.

In still yet another aspect of the present disclosure, the dial controller uses a displacement indicator and a displacement detector respectively separately disposed from the dial. In this manner, the dial controller has a simpler structure and an increased degree of freedom in terms of arrangement and/or design.

In still yet another aspect of the present disclosure, the dial controller uses a resistor for electrically detecting a rotation angle of the dial. In this manner, the dial controller requires a smaller installation space and an output signal from the resister is readily converted to the rotation angle of the dial.

In still yet another aspect of the present disclosure, the dial controller uses the dial having a resilient member that applies a resilient force to the indicator that slides on a slope. In this manner, the rotation angle of the dial in the dial controller is readily detected by the displacement detector. The indicator and the slope may be formed as a cam mechanism.

In still yet another aspect of the present disclosure, the dial controller uses the cam mechanism that uses the slope in a step shape. In this manner, the dial controller is suitably adapted as a controller for stepwise selection of physical quantity. Further, the dial controller acquires a stable control feel.

In still yet another aspect of the present disclosure, the dial of the dial controller is formed as a cylinder, and the cam mechanism is disposed in a groove at the bottom of the cylinder. In this manner, an outer shape of the dial controller is improved.

In still yet another aspect of the present disclosure, the dial controller uses a retainer disposed in the body for retaining the dial and for providing a supplemental sliding surface disposition space. In this manner, the structure of the dial controller is simplified and the installation space of the dial controller is reduced.

BRIEF DESCRIPTION OF THE DRAWINGS

Other objects, features and advantages of the present invention will become more apparent from the following detailed description made with reference to the accompanying drawings, in which:

FIG. 6A shows a cross-sectional view of a linear variable resistor unit;

FIG. 6B shows a cross-sectional view of the linear variable resistor unit along VIB-VIB line in FIG. 6A;

FIG. 6C shows a cross-sectional view of the linear variable resistor unit along VIC-VIC line in FIG. 6A;

DETAILED DESCRIPTION OF THE PREFERRED EMBODIMENTS

Embodiments and modifications thereof of the present disclosure are described with reference to the drawings.

Figure 1:
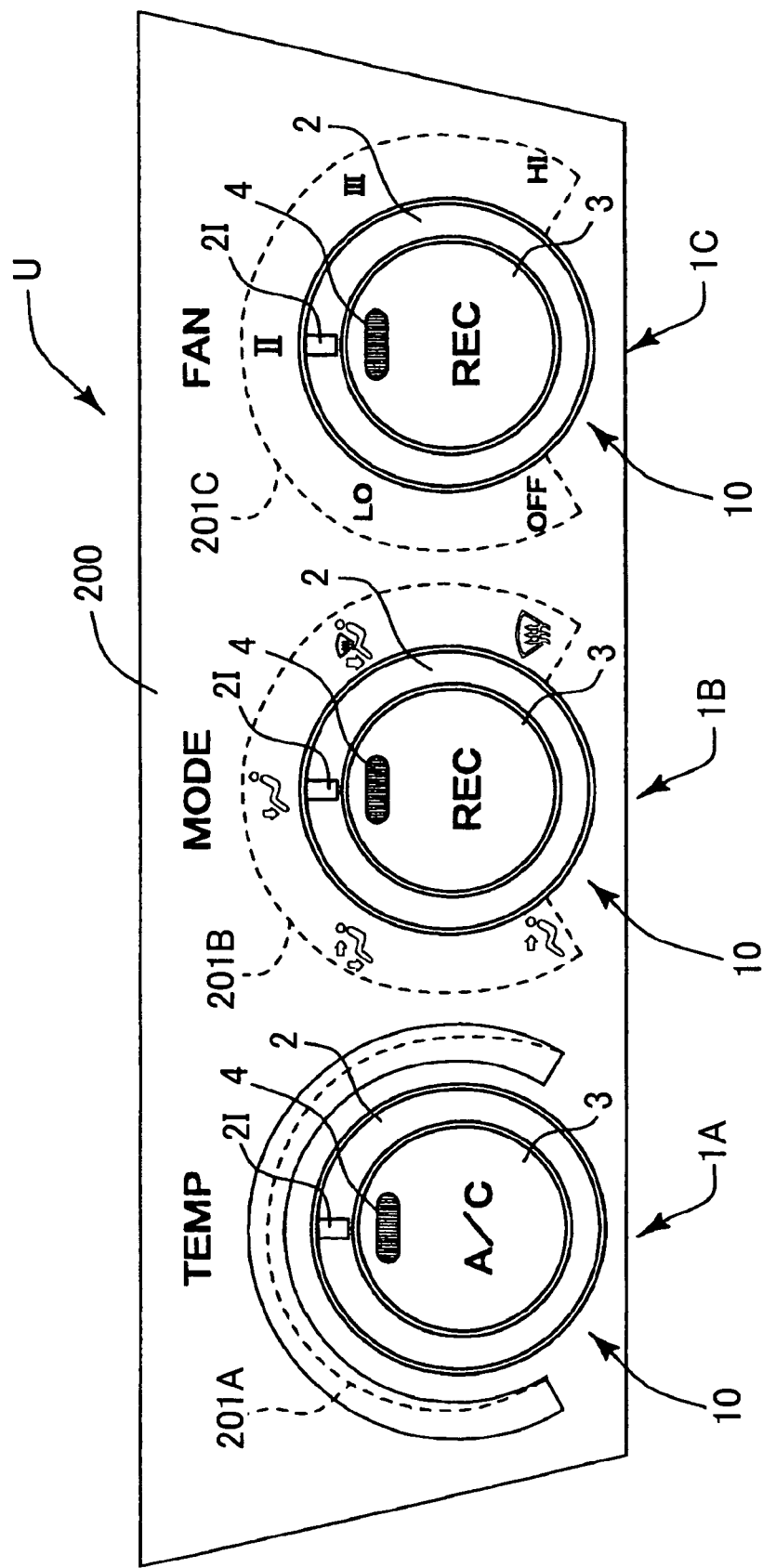
FIG. 1 shows a front view of a in-vehicle operation unit of the present disclosure.

FIG. 1 shows a front view of a in-vehicle operation unit U as an example of the present disclosure. The in-vehicle operation unit U is used to control an air-conditioner in a vehicle as a vehicular electrical device. The in-vehicle operation unit U is housed in a resin case (i.e., an instrument panel) 200. A front face of the case 200, i.e., a front face of the in-vehicle operation unit U, has dial controllers 1A, 1B, 1C (three controllers 1A, 1B, 1C are referred to by using the reference numeral 1 as an integral unit). The dial controllers 1A, 1B, 1C are disposed on the case 200 in a series arrangement in a row for a rotation operation by a user.

Each of the dial controllers 1A, 1B, 1C is used for controlling an air-conditioning function, and the dial controllers 1A, 1B, 1C are respectively functional as an air temperature setting unit, an air outlet selection unit, and an air flow selection unit. The front face of the case 200 has function display areas 201A, 201B, 201C along circumferences of respective dials 10 of the dial controllers 1A, 1B, 1C. Each of the dials 10 is used to select a desired selection/operation condition of the function assigned to a predetermined angle position of the respective function display areas 201A, 201B, 201C by rotating an indicator 21 of the dial 10 to be aligned thereto.

The dial 10 of the dial controller 1A has finer steps of an angular position for semi-continuously controlling the air temperature in comparison to the steps of the angular position of other two controllers 1B, 1C. The dial controllers 1B, 1C have five angular positions arranged in an equi-angular distance. Five angular positions of the dial controllers 1B of the air outlet selection unit are respectively assigned to "Face outlet," "Face+Foot outlets," "Foot outlet," "Foot+Defog outlets," and "Defog outlet." Five angular positions of the dial controllers 1C of the air flow selection unit are respectively assigned to "OFF (Shut off)," "LO (Air flow step I, or Auto)," "Air flow step II," "Air flow step III," and "HI (Air flow step IV)".

Figure 4A:
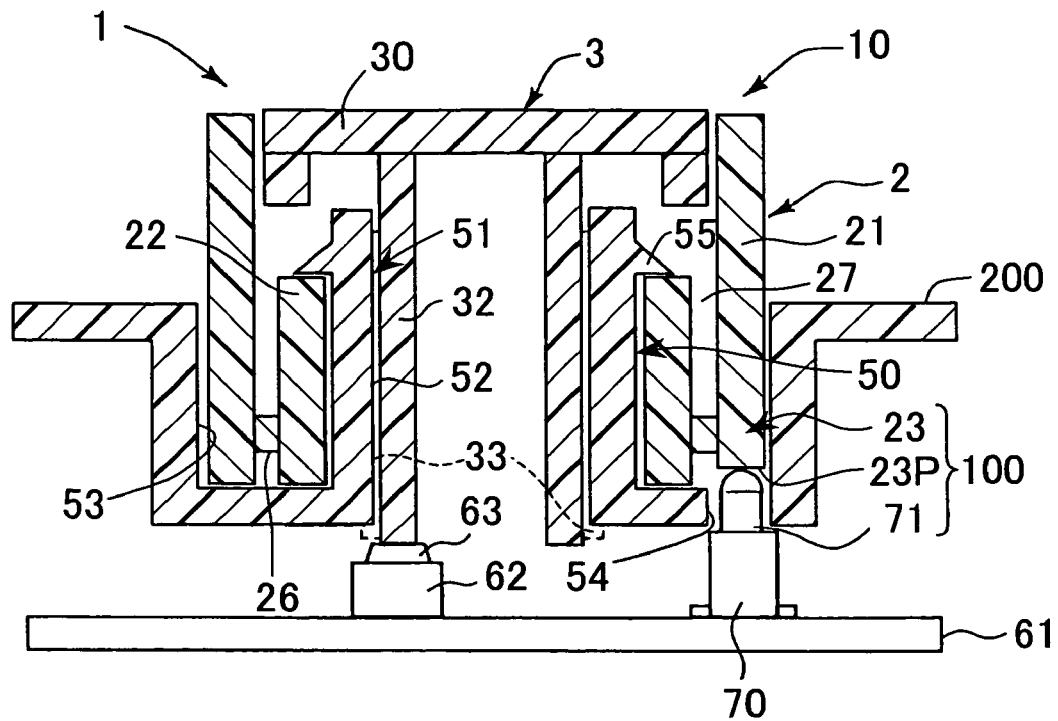
FIG. 4A shows a cross-sectional view of a body shown in FIG. 3.
Figure 4B:
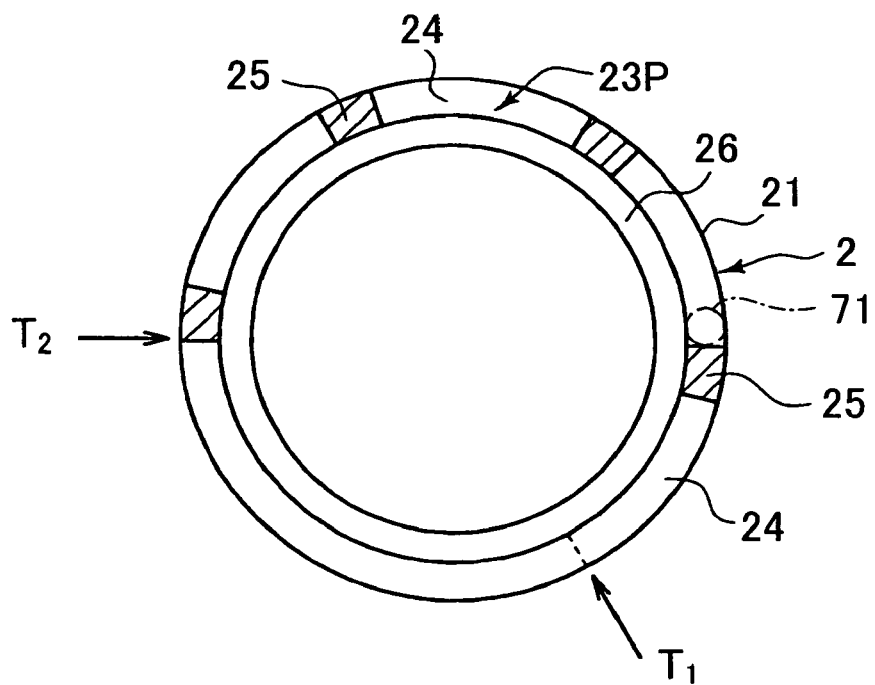
FIG. 4B shows a bottom view of the body show in FIG. 3.

The dial controller 1, as shown in FIGS. 4A and 4B, includes the dial 10, a displacement converter 100 that converts an angular displacement of the dial 10 to an axial displacement along a rotation axis of the dial 10 when the dial 10 is rotated, and a displacement detection unit 70 that detects the axial displacement along the rotation axis after conversion by the converter 100 and outputs information on a rotation angle of the dial 10 based on a detection result of the axial displacement. In the present embodiment, as shown in FIGS. 4A and 4B, an upper face of the dial that is operated by the user is defined as a first face, and an opposite side of the first face on the dial 10 is defined as a second face.

The dial 10 has a body 21 in a cylinder shape, and an inside of the body 21 has a non-rotatable supplemental device 3 that is exposed from the first face of the dial 10. As shown in FIG. 1, the supplemental device 3 is a press switch, and has an indicator 4 for indicating an ON/OFF condition. An operation mechanism of the supplemental device 3 is housed in the inside of the body 21 by positioning the displacement detection unit 70 at a radially outward position relative to the supplemental device 3 in a radial direction of the rotation axis of the dial 10.

Figure 3:
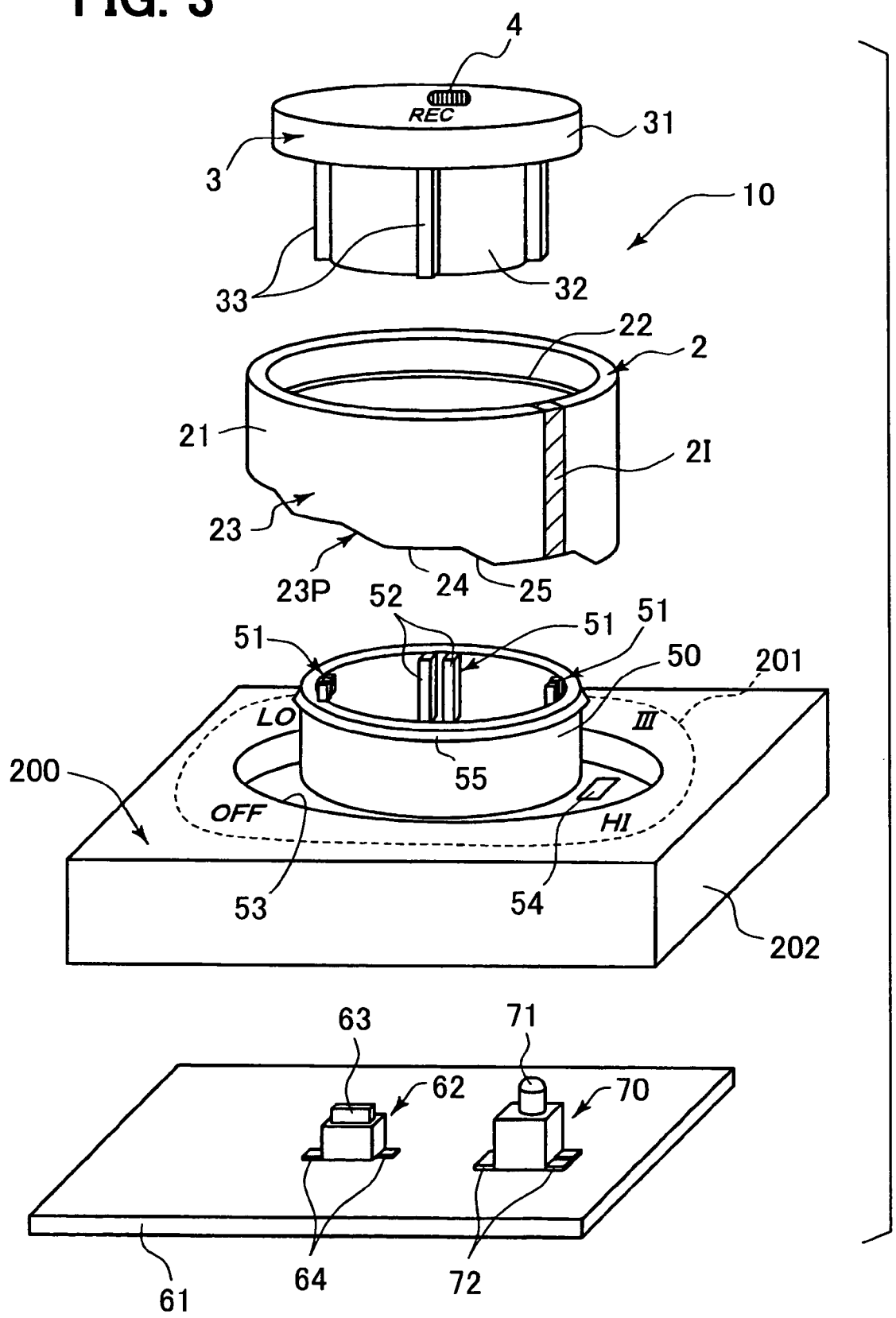
FIG. 3 shows a perspective exploded view of the dial controller in the embodiment.

The body 21 is disposed on the case 200 in a stationary manner in terms of a movement of the first face along the rotation axis of the dial 10, and is rotatable about the rotation axis. As shown in FIG. 3, a displacement formation surface 23P in a spiral slope shape along a circumference of the second face of the body 21 is disposed for converting the displacement of the dial 10 in the rotation operation. Also, as shown in FIG. 4A, a support base 61 has a displacement detection unit 70 at a predetermined angular position about the rotation axis, and the displacement detection unit 70 faces the displacement formation surface 23P. and includes an axial displacement detector 70 for detecting a position of the displacement formation surface 23P along the rotation axis. The support base 61 in the present embodiment is a substrate for circuitry that implements the displacement detection unit 70 (e.g., a linear variable resistor unit described in the following) and a tactile switch 62.

More practically, the displacement converter 100 is formed as a separate body from the dial 10, and includes a position indicator 71 and a displacement conversion mechanism 23 that converts the displacement in the rotation operation of the dial 10 to the axial displacement along the rotation axis of the dial 10. The axial displacement detector 70 detects the axial displacement of the position indicator 71 along the rotation axis of the dial 10, and outputs information on the rotation angle of the dial controller 1 based on a detection result of the axial displacement.

Figure 2:
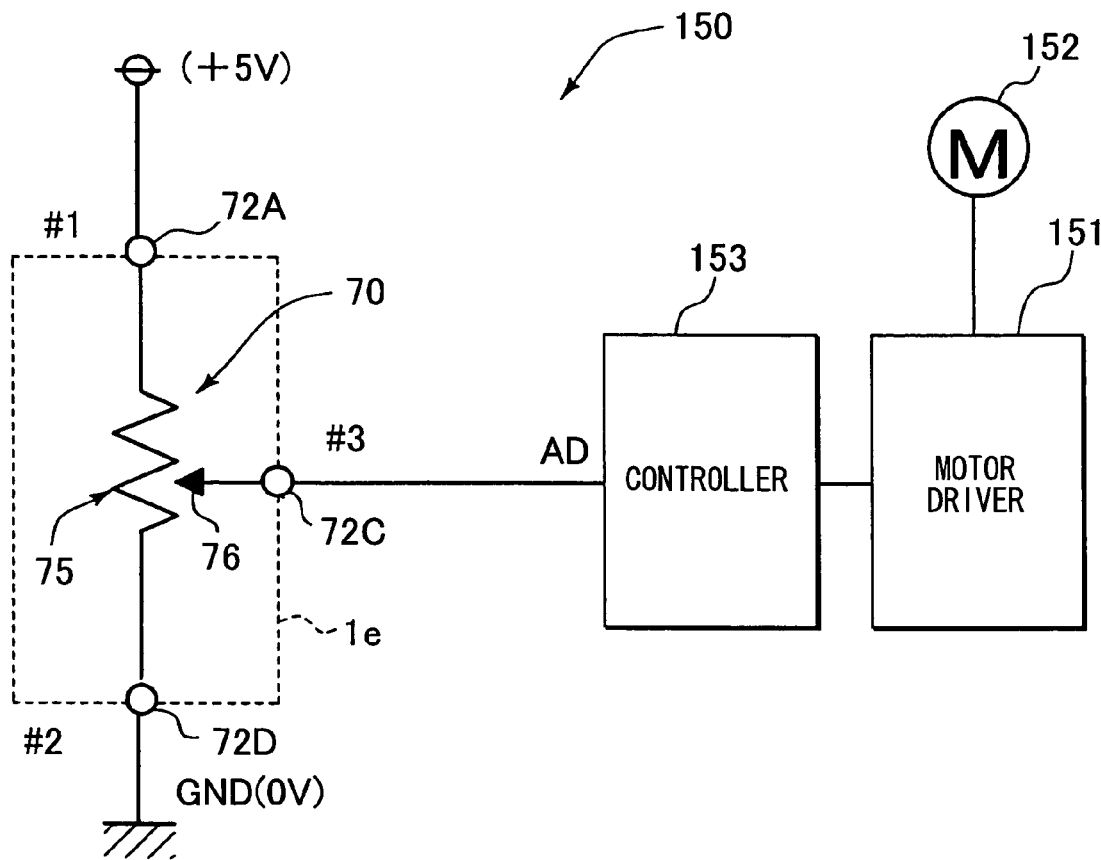
FIG. 2 shows a schematic diagram of an electric circuit in a dial controller in an embodiment of the present disclosure.

The axial displacement detector 70 in the present embodiment is, as shown in FIG. 6C, formed as a variable resistor that includes a sliding contact 76 that moves in association with a movement of the position indicator 71 along the rotation axis of the dial 10 and a resistant conductor 75 that is variably divided by the sliding contact 76 in terms of the resistance value. As shown in FIG. 2, one end of the resistance conductor 75 (i.e., a terminal 72A:#1) is coupled with a signal power source of +5V, and the other end of (i.e., a terminal 72B:#2) is coupled with a ground. The sliding contact 76 is functional as an output point (i.e., a terminal 72C:#3) of a divisional voltage of a half bridge circuit that is formed by dividing the resistance conductor 75 with the sliding contact 76.

The rotation angle of the dial 10 is reflected to the divisional voltage, thereby being detected by feeding the divisional voltage to a controller 153 that includes an ECU or the like. Then, the controller 153 understands a content of an instruction for vehicular devices according to the rotation angle of the dial 10 based on an input value of the divisional voltage, and outputs an instruction to a motor 152, or more precisely, to a driver 151 of the motor 152. The motor 152 in association with the dial controller 1A of the air temperature setting unit drives an air mix damper for mixing a cool air and a warm air. The motor 152 in association with the dial controller 1B of the air outlet selection unit drives an air outlet switching damper. The motor 152 in association with the dial controller 1C of the air amount selection unit is a fan motor.

The displacement converter 100 includes a middle section 23 that moves bi-directionally in an axial direction in accordance with the rotation operation of the dial 10 in a normal rotation direction and a reverse rotation direction. When a forward direction is defined as a direction from the first face to the second face in the axial direction and a backward direction is defined as an opposite direction of the forward direction, a backward biasing member 77 for biasing the position indicator 71 toward the middle section 23 is disposed as shown in FIG. 6A. The position indicator 71 is driven in the forward direction in accordance with a movement of the middle section 23 against a force from the backward biasing member 77 when the middle section 23 moves in the forward direction, and the position indicator 71 is driven in the backward direction in accordance with the backward movement of the middle section 23 when the middle section 23 moves in the backward direction by the force from the backward biasing member 77.

In the present disclosure, the backward biasing member 77 is a resilient member 77 made with a coil spring that is disposed on an opposite side of the position indicator 71 relative to the middle section 23 across the rotation axis as shown in FIGS. 6A and 6C. The support base 61 support in FIG. 4A supports the resilient member 77 from an opposite side relative to the position indicator 71. The resilient member 77 is compressed in a space between the middle section 23 and the support base 61 by a displacement that is directly proportional to a stroke of the middle section 23 in the forward direction.

The displacement converter 100 is, as shown in FIG. 3, disposed on a second face side of the dial 10, and is formed as a cam mechanism 100 that combines the middle section (cam unit) 23 having a sliding cam surface (i.e., the displacement formation surface) 23P in the spiral slope shape along the circumference of the dial 10 and a cam follower (i.e., the position indicator) 71 that slides along the sliding cam surface 23P in accordance with the rotation of the dial 10 in the normal and reverse directions for a movement in the axial direction.

As shown in FIG. 6A, the cam follower 71 and the resilient member 77 are part of the linear variable resistor unit 70. The linear variable resistor unit 70 includes a case 73 having an opening on an upper side, and a cap 74 for closing the opening. Though, for the convenience of the description of the structure of the linear variable resistor unit 70 shown in the figure, the opening of the case 73 is described as an upper side, the opening of the case 73 is not necessarily disposed facing upward. In other words, the terms such as "upward" and "downward" in the following description does not necessarily limit the orientation of the disposition of the linear variable resistor unit 70.

The case 73 is made of resin, and an inner wall of the case 73 has a lead frame 78 disposed thereon. The lead frame 78 is made of metal, and plural terminal frames 78A, 78B, 78C is formed thereon. The terminal frames 78A has a lateral frame 78H disposed on an upper end thereof. Lower ends of the terminal frames 78A, 78B, 78C pierce a bottom of the case 73, and are electrically coupled with pads 72A, 72B, 72C for surface mounting on a reverse side of the bottom. The terminal frame 78B in the middle of the three frames and the lateral frame 78H are coupled with a resistance conductor 75 made of a carbon film in a shape of longitudinally longer formation. The lead frame 78 is fixed on the case 73 by insert-molding so that a main surface of the frame 78 is in line with the inner wall of the case 73.

The case 73 has a position marker 73b for positioning the coil spring (the resilient member) 77 on an upper surface of the bottom. The coil spring 77 is positioned by the position marker 73b with a lower end fitted thereon. An upper end of the coil spring 77 is abutted to the cam follower 71. The cam follower 71 has a spherical upper end that abuts to the sliding cam surface 23 (FIG. 3), and is made of resin. A body of the cam follower 71 is formed in a cylinder shape, and a lower side of the body of the cam follower 71 is reduced in diameter and fitted into an upper inside of the coil spring 77.

The cam follower 71 has an upper end that protrudes from a through hole 74h of the cap 74, and has a lower end having a metal sliding frame 79 disposed thereon. Each of both ends of the sliding frame 79 has a sliding contact 76 formed thereon, and one of the sliding contact 76 is in contact with the resistance conductor 75 with the other one of the sliding contact 76 being slidably in contact with the terminal frame 78C in an up-down direction. The sliding frame 79 integrally formed with the sliding contacts 76 is made of spring metal material such as phosphor bronze for spring, beryllium copper or the like. The sliding contacts 76 extends toward a lower side from both ends of the sliding frame 79 in a band shape, and a middle portion of the band shape has a raised cut portion that is resiliently abutted to the resistance conductor 75 or the terminal frame 78C.

Figure 7A:
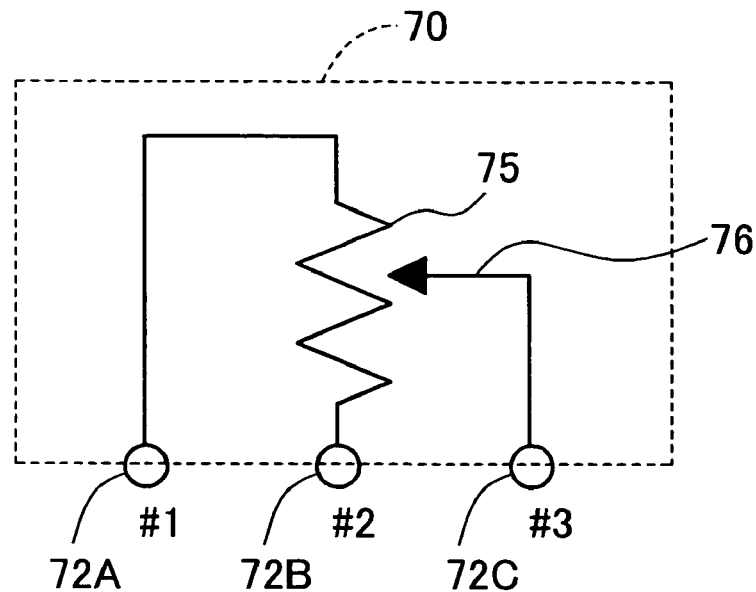
FIG. 7A shows a schematic diagram of an equivalent circuit in the linear variable resistor unit.
Figure 7B:
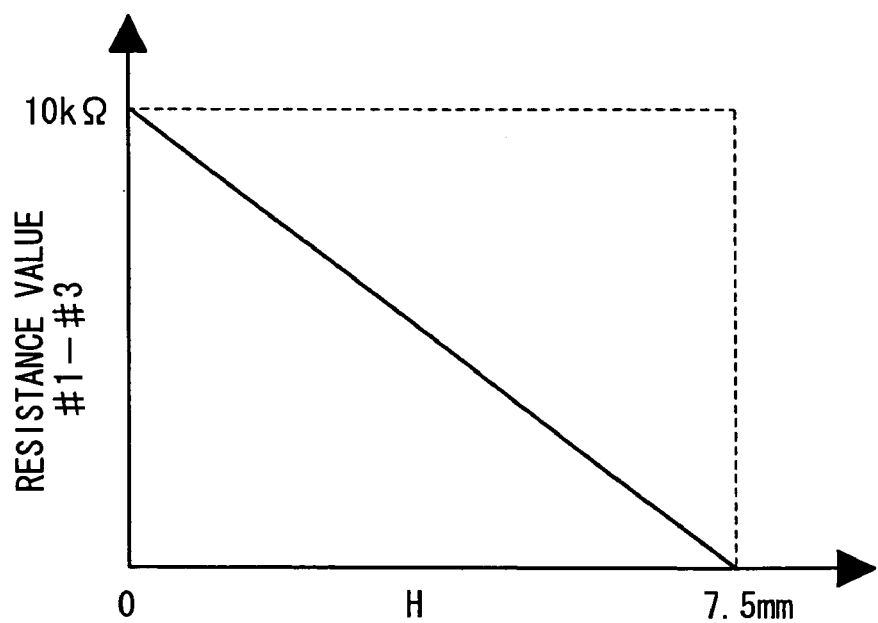
FIG. 7B shows a characteristic diagram of the linear variable resistor unit.

As the dial 10 is rotated, the cam follower 71 moves upwards/downwards in FIG. 6A. As a result, the sliding contacts 76 divides the resistance conductor 75 in a ration that is directly proportionally to a position of the cam follower 71 as shown in FIG. 7A. In this manner, the divisional voltage at the pad 72C varies linearly as shown in FIG. 7B. In the present embodiment, the resistance conductor 75 has a nominal resistance value of 10 kΩ, and a maximum protrusion length of the cam follower 71 is determined as 7.5 mm.

Figure 8:
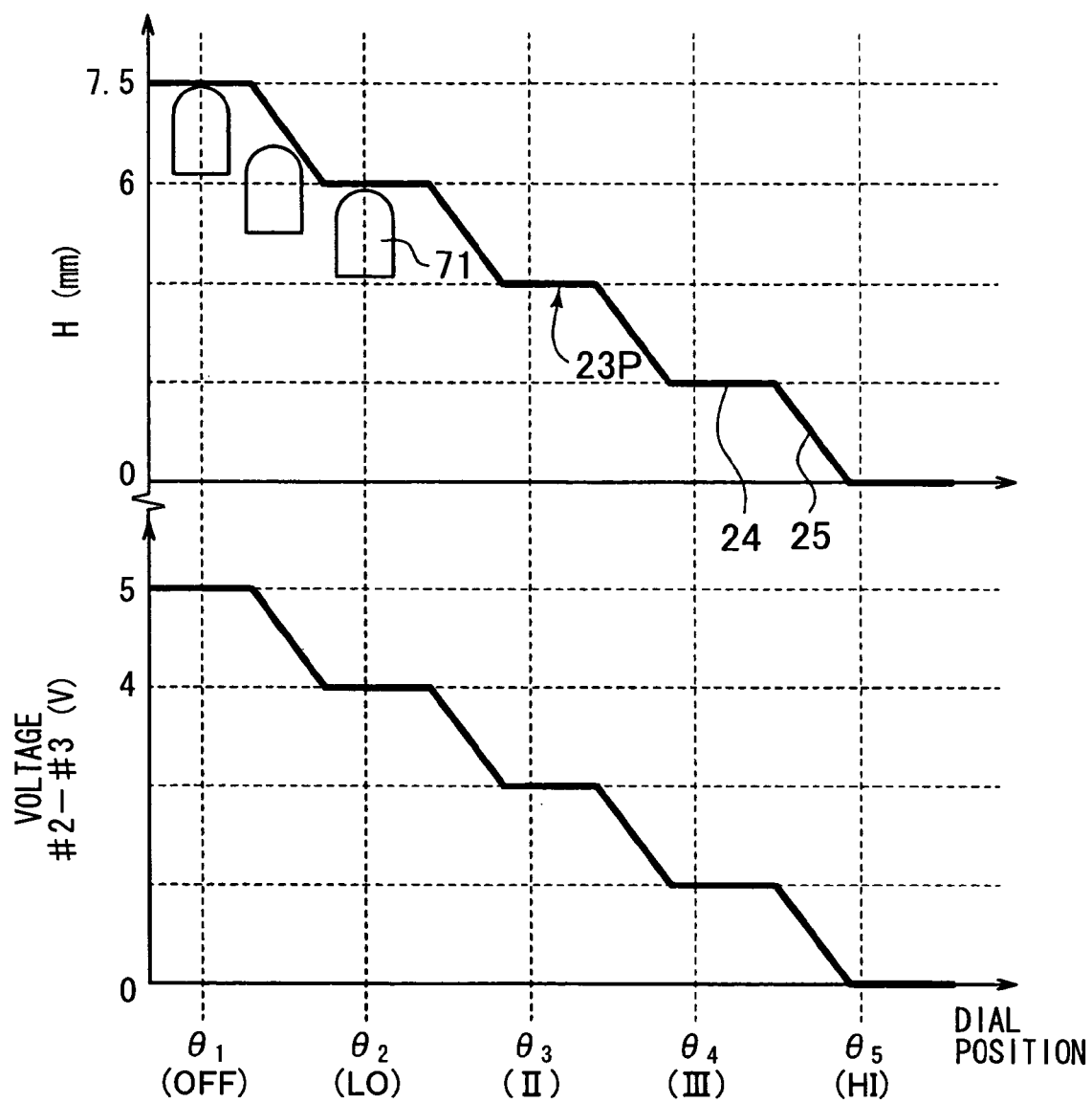
FIG. 8 shows an illustration diagram of an operation of the dial controller in FIG. 3.
Figure 12:
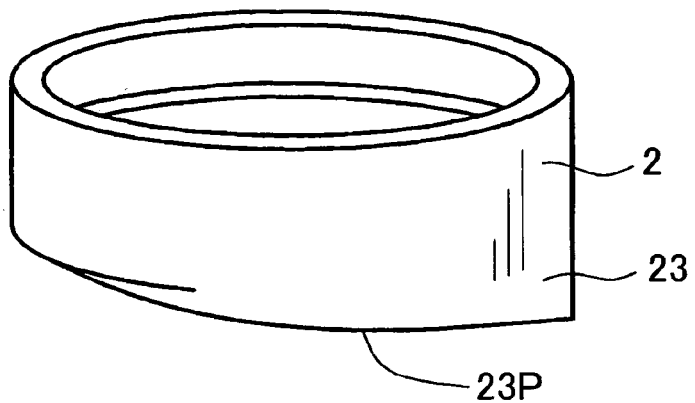
FIG. 12 shows an illustration of a modification of a cam mechanism.

As shown in FIG. 12, the sliding cam surface 23P may be formed in an entirely slanted surface. For example, the dial controller 1A for controlling the air temperature setting may be used to control its angular position in a continuous manner, or in semi-continuous manner, thereby serving effectively in the above-mentioned slanted shape in its entirety. On the other hand, the dial controllers 1B, 1C for controlling the air outlet selection/the air amount selection may preferably have a step shape that is made up from an alternated succession of a slope section 25 and a flat section 24 as shown in FIG. 3 along the circumference of the dial 10, because the air outlet selection and the air amount selection are used to select discreet characteristics or stepwise amounts. In this manner, as shown in FIG. 8, the rotation position of the dial 10 anywhere in the flat section 24 corresponds to the same output voltage that indicates the same angular position, thereby effectively serving for the stepwise output of the detected angular position.

FIG. 4B shows a bottom view of the sliding cam surface 23P. The slope sections 25 are shown in a slant hatching pattern. T1 and T2 are rotation limits of the rotation operation of the dial 10. The rotation of the dial 10 is restricted between the rotation limits T1/T2 by stoppers disposed on both of the case 200 and the body 21.

As shown in FIG. 2, the dial 10 has the body in the cylinder shape, and the sliding cam surface 23P is formed on one end of the body 21. The body 21 is coveringly and concentrically disposed on a rotation support convex 50 having a cylindrical outer shape and protruding on a front face of the case 200. The rotation support convex 50 has a circular depression 53 surrounding its base portion on an instrument panel for hiding the cam mechanism 23 that is formed on the second face side of the body 21. The cam follower 71 protrudes from a through hole 54 on a bottom of the circular depression 53.

As shown in FIG. 4A, an inside of the body 21 has a cylindrical installation support 22 disposed therein. The cylindrical installation support 22 is disposed concentrically with an inner wall of the body 21 with a cylindrical gap space preserved therebetween. A second face side end of the cylindrical installation support 22 has a connecting rib 26 on an outer surface for connecting the outer side to an inner surface of the body 21. The rib 26 connects the outer surface of the support 22 and the inner surface of the body 21 resiliently in the radial direction. At a position that corresponds to the first face of the cylindrical installation support 22, the outer surface of the rotation support convex 50 has a convex retainer 55 that retains the cylindrical installation support 22 from falling. The connecting rib 26 is formed in a cylindrical shape along the outer surface of the body 21. The retainer 55 has a triangular cross section, and a bottom side of the triangle forms an abutting surface with its slant side formed as a guide surface for guiding an insertion of the cylindrical installation support 22 from the first face side (the guide surface may have a curved surface). The body 21, the cylindrical installation support 22 and the connecting rib 26 are integrally formed as an injection molding body 2 made of resin (e.g., ABS resin).

Figure 5A:
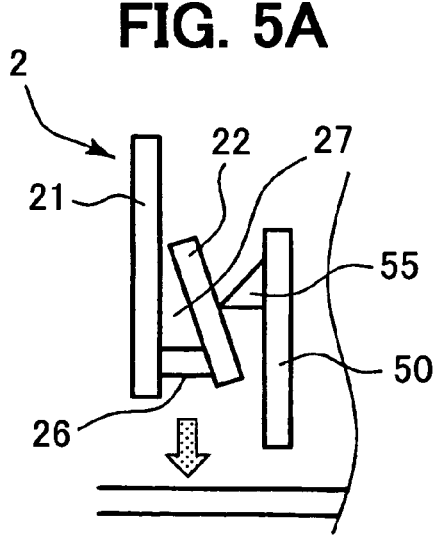
FIGS. 5A and 5B show illustrations of an installation support cylinder.
Figure 5B:
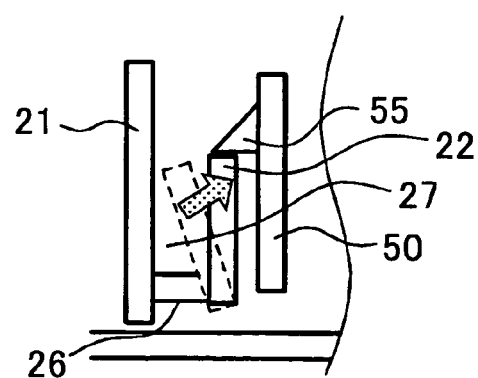

As shown in FIGS. 5A and 5B, the injection molding body 2 is installed on the rotation support convex 50 from its second face side. The cylindrical installation support 22 goes over the convex retainer 55 by resiliently expanding in the radial direction so that the first face is catched and retained by the retainer 55.

The supplemental device 3 formed as a press switch has a resin mold body that includes a button body 30 in a disk shape and a sliding cylinder 32 disposed on a reverse side of the button body 30. The supplemental device 3 is formed with resin such as ABS resin or the like. The cylinder 32 is inserted in the rotation support convex 50 in the axial direction, and is movably supported by the convex 50 that allows a predetermined range of axial movement of the cylinder 32. The cylinder 32 presses the tactile switch 62 on the substrate 61 by its second face when moved forward along the rotation axis. The tactile switch 62 is otherwise turned off by being pressed backward by a spring disposed therein. As shown in FIG. 3, the cylinder 32 has a guide rib 33 radially outwardly extending on its outer surface for guiding a sliding movement of the by engaging a guide groove 51 (a pair of ribs 52). The guide rib 33 and the guide groove 51 serve as a stopper of rotating movement of the button body 30 and the cylinder 32 relative to the rotation support convex 50. In the present embodiment, the stopper structure as a combination of the guide rib 33 and the guide groove 51 is disposed at plural position of the circumference of the cylinder 32.

Although the present disclosure has been fully described in connection with the preferred embodiments thereof with reference to the accompanying drawings, it is to be noted that various changes and modifications will become apparent to those skilled in the art.

Modifications of the dial controllers are described in the following. Like parts have like numbers in the following description, and the description of the like parts is either abbreviated or omitted.

The dial 10 of the dial controller is preferably rotated in a stepwise manner by implementing the following structure. That is, the dial 10 is retained at one of plural predetermined positions of a retainer that temporarily retains the rotation of the dial 10. At the plural predetermined positions, the dial 10 is preferably held by the retainer that applies a retaining force to the dial 10 for stability of the retention at those positions. More practically, the rotation of the dial 10 may be held at the angular positions where the cam follower 71 faces the flat section 24 for improved stability and positional accuracy.

Figure 9A:
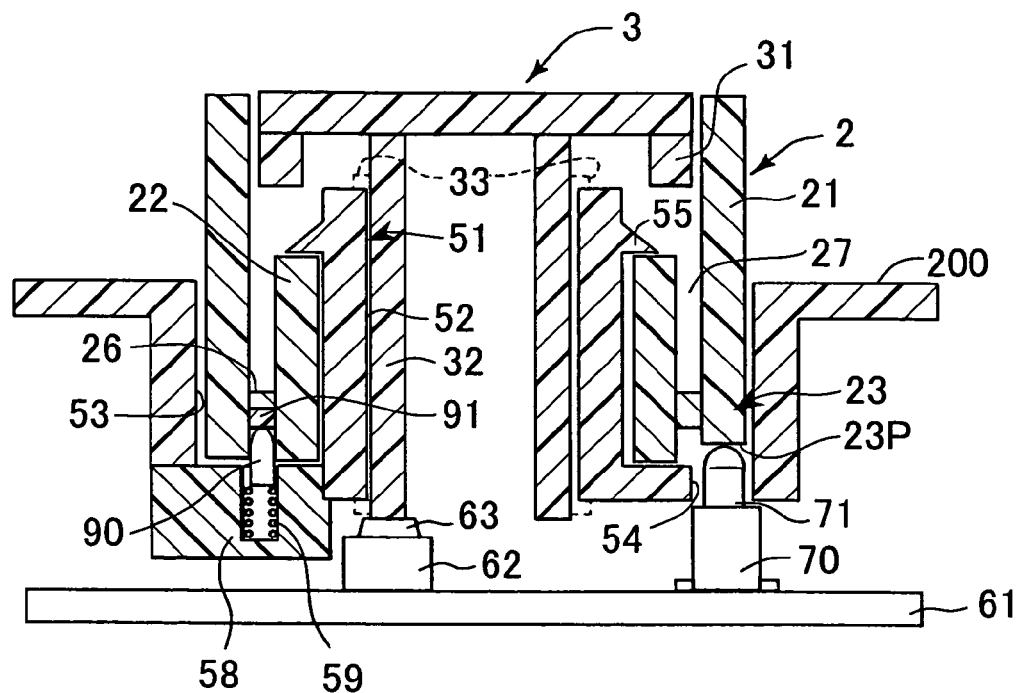
FIG. 9A shows a cross-sectional view of a first modification of the body of the dial controller shown in FIG. 3.
Figure 9B:
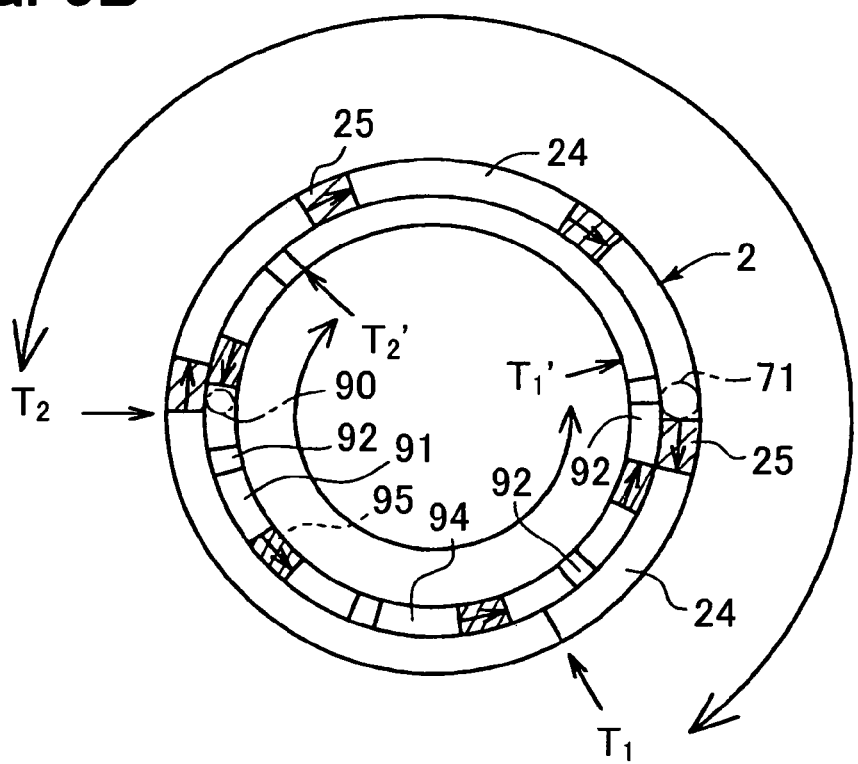
FIG. 9B shows a bottom view of the first modification of the body of the dial controller shown in FIG. 3.

The retainer for retaining the dial 10 at a certain angular position may be provided in the following manner. That is, as shown in FIGS. 9A and 9B, the second face of the dial 10 is provided with a supplemental sliding surface 91 that is formed separately from the sliding cam surface 23P, and the support base 61 is provided with a supplemental sliding member 90 that faces the supplemental sliding surface 91 in a sliding contact therewith at a predetermined angular position of the rotation axis when the dial 10 is rotated. An edge of the supplemental sliding member 90 rides over the supplemental sliding surface 91 in a sliding contact therewith when the dial 10 is rotated. The retainer includes a convex position marker 90t that protrudes from one of the supplemental sliding surface 91 and the supplemental sliding member 90 in the axial direction, and a concave position marker 92 that fittingly engages the convex position marker 90t. In this manner, the convex position marker 90t engages the concave position marker 92 when the dial 10 is positioned at the predetermined angular position, and the convex position marker 90t disengages the concave position marker 92 by resiliently going over the edge in a rotating direction of the dial 10 when the dial 10 is rotated. Therefore, the engagement between the convex position marker 90t and the concave position marker 92 holds the dial 10 at the predetermined angular position with increased stability, and the disengagement of the convex position marker 90t from the concave position marker 92 in a resilient manner is provided with a suitable degree of resistance caused by the edge in the rotating direction. As a result, the operation of the dial controller by the user acquires the improved stability and positional accuracy.

As shown in FIG. 9B, the supplemental sliding surface 91 and the sliding cam surface 23P are formed in at least partially overlapping manner at respectively different positions in the radial direction of the rotation axis. In this manner, the supplemental sliding surface 91 and the sliding cam surface 23P do not interfere with each other in the radial direction, thereby providing an increased amount of freedom in terms of the rotation angle of the operation. This structure is especially advantageous for the operation having the rotation angle over 180 degrees. That is, the rotation angle from T1 to T2 is covered by the sliding cam surface 23P, and the rotation angle from T1' to T2' is covered by the supplemental sliding surface 91. The supplemental sliding surface 91 is formed on the second face side of the rib 26 according to FIG. 9A. In addition, the supplemental sliding surface 91 formed on the connecting rib 26 provides increased space efficiency because connection between the cylindrical installation support 22 and the body 21 is structurally required for composing the dial 10. Furthermore, the sliding cam surface 23P formed on the second face of the body 21, thereby enabling the position of the supplemental sliding surface 91 to be located at a radially different position from the position of the sliding cam surface 23P.

The support base 61 may have a supplemental resilient member 59 at each of the positions of the retainers (the convex position marker 90t/the concave position marker 92) for pressingly engaging the position markers 90t and 92. In this case, a force from the supplemental resilient member 59 serves as a resistance force for disengagement of the convex position marker 90t from the concave marker 92, and also serves as a pressing force for pressing the convex marker 90t against the supplemental sliding surface 91 when the dial 10 is rotated. Therefore, the resistance force for disengagement and positional stability caused by the friction between the support base 61 and the position markers 90t and 92 is suitably applied to the rotation operation of the dial 10 by adjusting the resilience of the resilient member 59. As a result, the dial 10 is prevented from being displaced in the circumferential directions by the vibration of the vehicle and/or a small external force.

As shown in FIGS. 9A and 9B, the supplemental sliding surface 91 and the sliding cam surface 23P respectively form spiral slopes that slant in opposite directions, and the supplemental sliding member 90 and the cam follower 71 move along the rotation axis in opposite directions as the dial 10 rotates. Further, the resilient member 77 and the supplemental resilient member 59 are respectively compressed by the support base 61 and the cam follower 71 or the supplemental cam follower 90 by a degree that is proportional to the displacement of the followers 71 and 90 in the forward direction.

For example, the supplemental resilient member 59 is a coil spring that is disposed on the bottom of the circular depression 53 in the case 200 with one end buried therein as shown in FIG. 9A. In this structure, a rotational reaction force for the dial 10 caused by the resilient member 77 that presses the cam follower 71 against the slope is cancelled by another rotational reaction force in the opposite direction caused by the supplemental resilient member 59 that presses the supplemental cam follower 59 against the slope, thereby providing a suitable operation feel for the rotation operation of the dial 10 based on a provision of a cancellation of the rotational reaction force.

Further, the friction in the rotation operation caused by the cam follower 71 increases as the resilient member 77 is increasingly compressed by the rotation of the dial 10 toward the limit of the rotation if there is no supplemental structure. However, the supplemental resilient member 59 in combination with the slope (the supplemental sliding surface 91) that slants in the opposite direction provides a supplemental reaction force that generates the supplemental friction for the rotation of the dial 10 in a reversely proportional manner, thereby providing a suitable operation feel for the rotation operation of the dial based on a provision of a constant total friction. The constant total friction is appropriately provided when the following conditions are fulfilled. That is, (1) elastic constants for both of the resilient member 77 and the supplemental resilient member 59 have same value, and (2) the resilient member 77 and the supplemental resilient member 59 are compressed by the same amount when the dial 10 is rotated to both rotation limits. That is, the displacement of the both slopes (i.e., both sliding surfaces) are the same.

Figure 10:
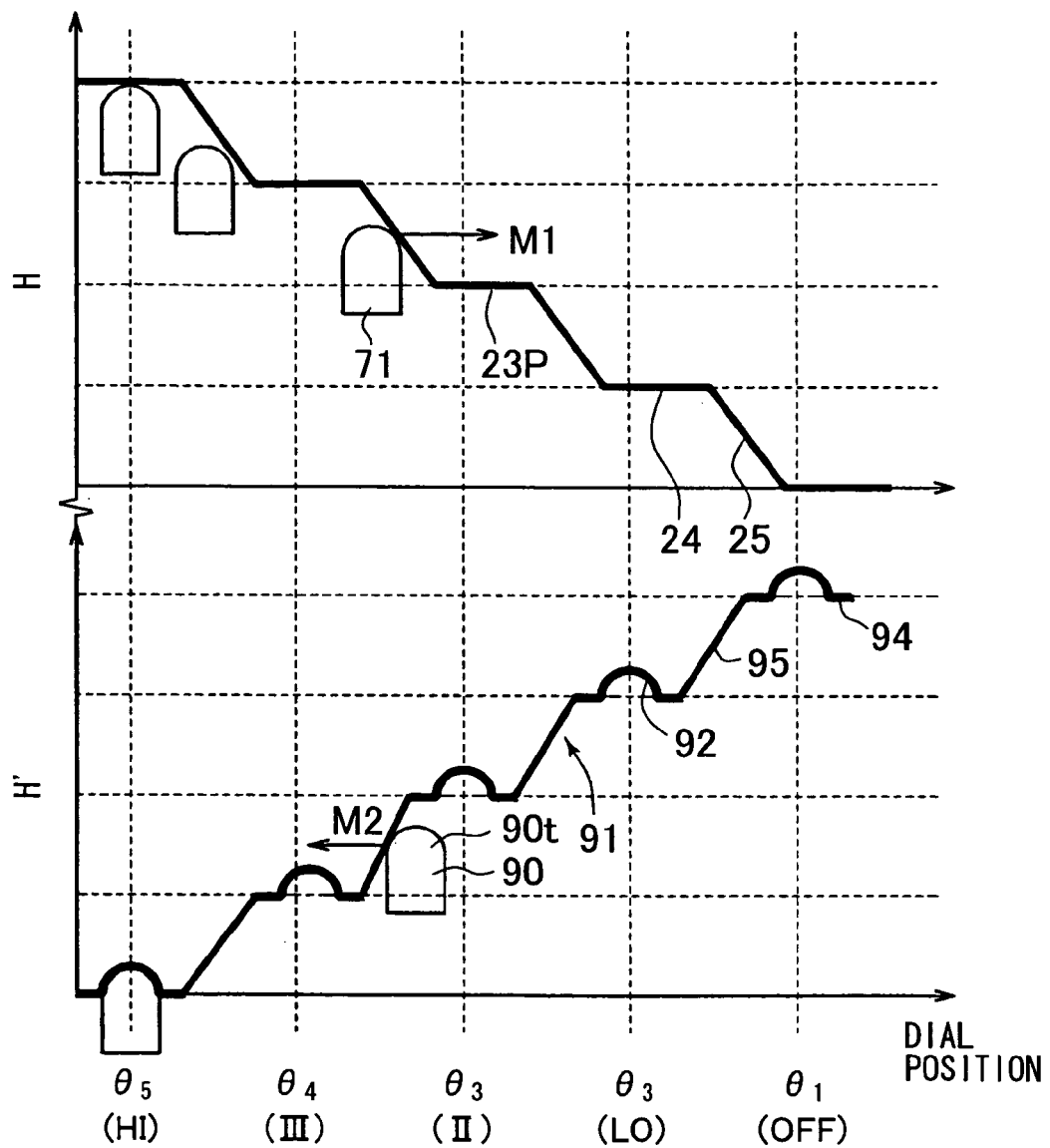
FIG. 10 shows an illustration diagram of an operation of the dial controller in FIGS. 9A and 9B.
Figure 11:
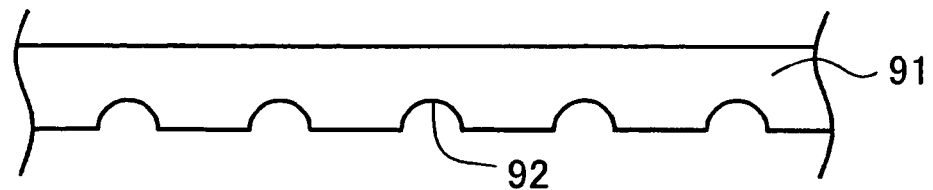
FIG. 11 shows an illustration of a modification of a supplemental sliding surface.

The relationship of the rotational reaction forces M1, M2 caused by the resilient members 77, 59 and the cam followers 71, 90 is illustrated in more detail with reference to the drawings in FIGS. 9A, 9B and the diagram in FIG. 10. As described above, the sliding cam surface 23P and the supplemental sliding surface 91 have alternation of the flat sections (24, 94) and the slope sections (25, 95). Further, the flat section 94 has the convex position markers 92 disposed therein. In this manner, the rotational reaction forces M1 from the cam follower 71 is cancelled by the counter reaction force M2 toward an opposite direction for a reduction of strange feel in the operation of the dial 10, and the angular positions of the dial 10 is stably retained by the engagement of the position markers 92, thereby providing a suitable operation feel for the user when the dial controllers 1B, 1C are operated. Furthermore, the supplemental sliding surface 91 may have only the flat sections 94 with the concave position markers 92 instead of having alternation of the flat sections 94 and the slope sections 95.

Figure 13:
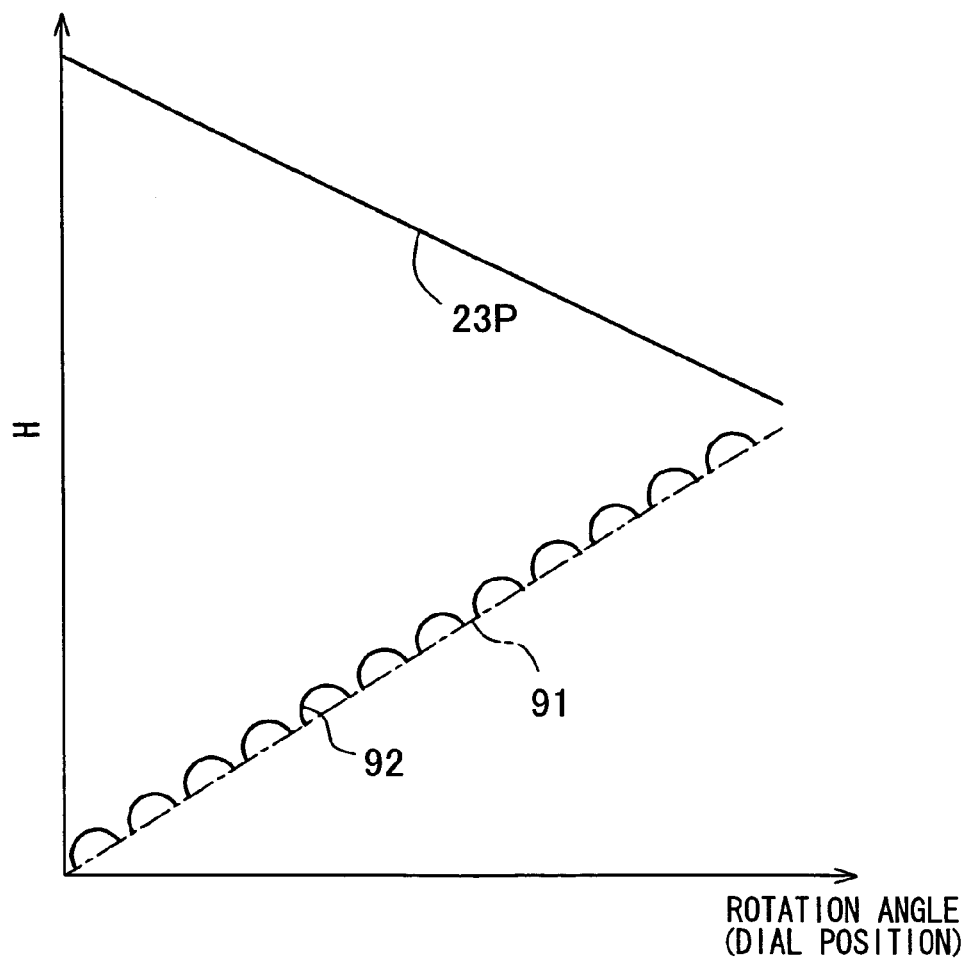
FIG. 13 shows an illustration diagram of the dial controller having the cam mechanism shown in FIG. 12.

On the other hand, the dial controller 1A may have the sliding cam surface 23P formed as an entire slope surface as shown in FIG. 12. In this case, the supplemental sliding surface 91 may also be formed as an entire slope surface with the position markers 92 disposed therein in a closely arranged manner as illustrated in FIG. 13. In this manner, the rotational reaction force and the counter reaction force are suitable canceling. Further, the supplemental sliding surface 91 may be a slope without position markers 92 as shown by a broken line in FIG. 13.

Figure 14:
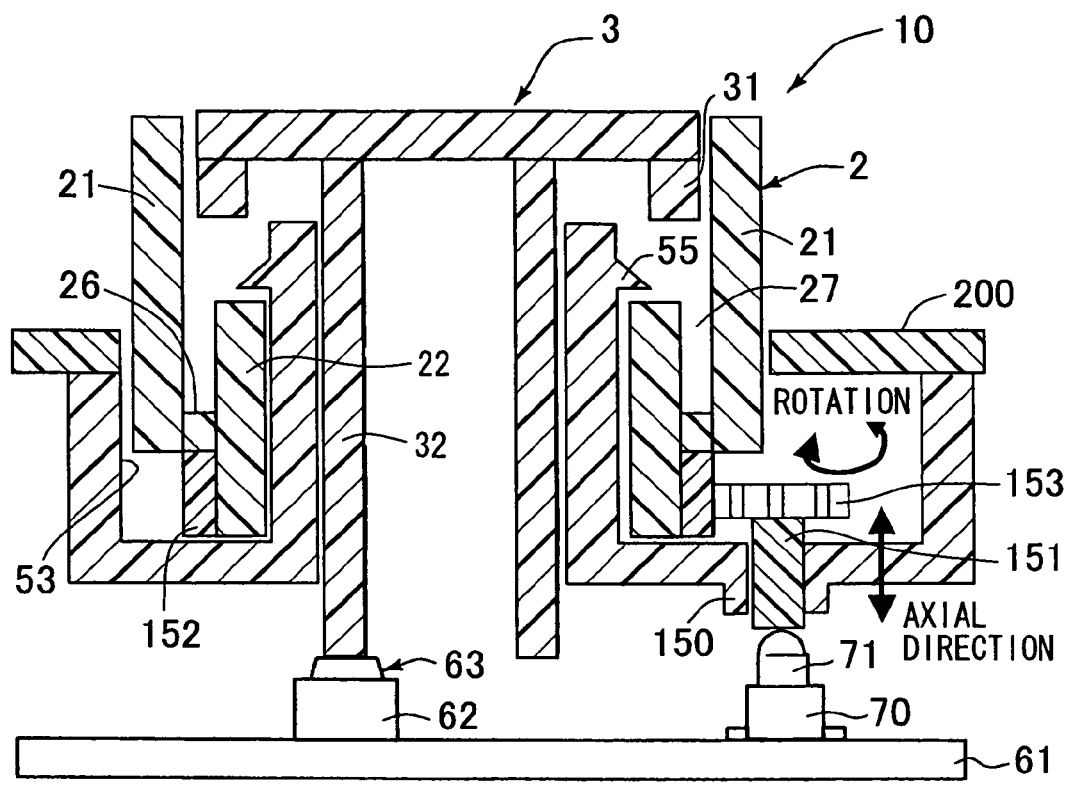
FIG. 14 shows a cross-sectional view of a second modification of the dial controller in FIG. 3.

FIG. 14 shows an illustration of modification for the displacement converter 100. In this case, the middle section that moves in the axial direction is provided as a male screw 151 instead of the middle section (cam unit) 23. In this structure, a first gear 152 disposed concentrically with the dial 10 for conveying rotation of the dial 10 and a second gear 153 that moves bi-directionally in the axial direction in an engagement with the first gear 152 are provided. In addition, a female screw 150 is provided in the following manner. That is, the female screw 150 has the male screw 151 that pierces the female screw 150 from the first face side thereof, and the second face side end of the male screw 150 protrudes from the second face side of the female screw 150. More practically, the female screw 150 is bored on the bottom of the case 200.

The male screw 151 is screwed into the female screw 150 to be abutted to the cam follower 71 of the linear variable resistor unit 70 through the case 200 by its second face side end. The make screw 151 has the first gear 152 at a top thereof for the engagement with the second gear 153 that is disposed on the outer circumference of the dial 10. The first gear 152 is allowed to move bi-directionally in the axial direction (i.e., thrust movement is allowed as it rotates.) The male screw 151 moves up or down as the dial 10 rotates, and the movement in the axial direction is detected by the resistor unit 70. In this manner, the dial 10 is stably positioned at certain angular positions without using engagement mechanism of the position markers. Further, the protrusion of the male screw 151 from the female screw 150 can precisely changed according the rotation angle of the dial 10.

The number of teeth in the first gear 152 is fewer than the number of teeth in the second gear 153. That is, the first gear 152 is smaller in diameter than the second gear 153. The first gear 152 rotates plural times when the dial 10 is rotated from one rotation limit to the other limit. The second face side of the cylindrical installation support 22 protrudes from the second face side of the body 2, and the protruding portion of the support 22 has the second gear 153 disposed thereon. In this manner, the first gear 152 is closely located to the dial 10 on the rotation axis side for space efficiency.

Figure 15:
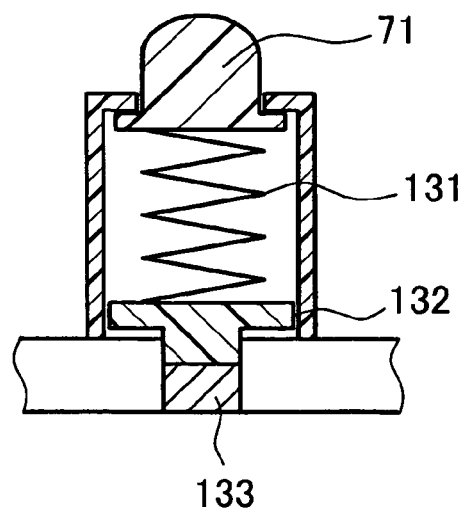
FIG. 15 shows a cross-sectional view of a first modification of a displacement detection unit.

The displacement detection unit 70 may be made with various sensors beside being made with the resistor unit. FIG. 15 shows an example that the detection unit 70 is made with a weight sensor 133 such as a piezoelectric element, a condenser, a strain gauge or the like. In this manner, the displacement caused by the compressed resilient member 131 in accordance with the movement of the cam follower 71 is transferred to the weight sensor 133. Therefore, the rotation operation of the dial 10 is converted to the displacement of the cam follower 71 either by the cam mechanism in FIG. 4 or by the screw mechanism in FIG. 14 and the force from the resilient member 131 is detected as an output from the weight sensor 133 for detection the rotation angle of the dial 10. In this case, the weight sensor 133 and the resilient member 131 is interposed by a spring catcher 132 inserted therein.

Figure 16:
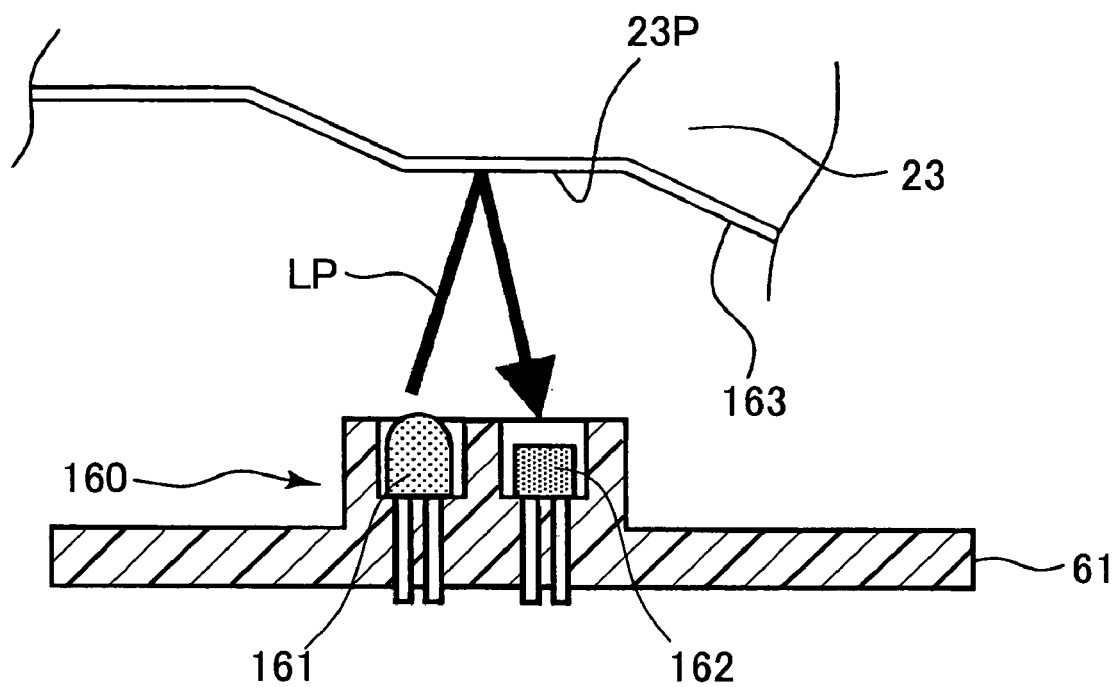
FIG. 16 shows a cross-sectional view of a second modification of the displacement detection unit.

FIG. 16 shows the displacement detection mechanism by using an optical sensor. That is, a reflector 162 is formed on the displacement formation surface 23P by using a metal material, and the displacement of the surface 23P in the axial direction of the dial 10 is detected by an optical distance sensor 160. The optical sensor 160 emits a laser pulse LP from a light projection unit 161 toward the reflector 162, and receives a reflected pulse by a light receiving unit 162. In this manner, the displacement, i.e., the distance, from the surface 23P is detected based on the elapsed time between the projection and reception of the laser pulse LP.

Such changes and modifications are to be understood as being within the scope of the present invention as defined by the appended claims.

What is claimed is:

1. A dial controller comprising:
   a dial;
   a displacement converter for converting a rotational displacement caused by a rotation operation of the dial to an axial displacement of the dial along a rotation axis of the dial;
   a displacement detector for detecting and outputting information on a rotation angle of the dial based on a detection result of the axial displacement of the dial;
   a position indicator being disposed separately from the dial in an axially movable manner along the rotation axis of the dial; and
   a displacement conversion mechanism for converting the rotational displacement caused by the rotation operation of the dial to the axial displacement of the position indicator along the rotation axis in a course of transmission thereof, wherein
   the displacement detector detects a position of the position indicator along the rotation axis of the dial,
   the displacement detector outputs the rotation angle of the dial based on the detection result of the position of the position indicator, and
   the displacement detector includes a sliding electrical contact that is movable along the rotation axis of the dial in association with a movement of the position indicator and a variable resistor that is variably divided by the sliding electrical contact in terms of a resistance value of the variable resistor.

2. The dial controller as in claim 1,
   wherein the dial has a first face on one axial end that is susceptible to an external operation and a second face on the other axial end that is opposite to the one axial end,
   the dial has a body in a cylindrical shape,
   the body of the dial includes a supplemental device that is disposed therein to be exposed from the first face in a non-rotatable manner, and
   the displacement detector is disposed at a position outwardly farther than the supplemental device from the rotation axis of the dial in a radial direction.

3. The dial controller as in claim 2 further comprising:
   a case for having the body of the dial to be disposed thereon;
   a support base for supporting the dial; and
   an axial position detector,
   wherein the body of the dial is disposed on the case in a rotatable manner about the rotation axis with the first face fixed at a stationary position,
   the displacement converter has a displacement formation surface formed along a periphery of the second face in a spiral slope shape, and
   the displacement detector includes the axial position detector that is disposed on the support base at a predetermined angular position to face the displacement formation surface for detecting a position of the displacement formation surface in an axial direction of the dial.

4. The dial controller as in claim 1,
   wherein the displacement conversion mechanism includes a middle section that moves bi-directionally in a forward and a backward direction along the rotation axis of the dial in accordance with the rotation operation of the dial in a normal and a reverse rotation direction,
   the dial has a first face on one axial end that is susceptible to an external operation and a second face on the other axial end that is opposite to the one axial end,
   the position indicator is pressed by a backward biasing member toward the middle section in the backward direction that is defined as a direction from the second face to the first face and an opposite direction of the forward direction,
   the position indicator is driven in the forward direction in accordance with a movement of the middle section against a force from the backward biasing member when the middle section moves in the forward direction, and
   the position indicator is driven in the backward direction in accordance with the movement of the middle section when the middle section moves in the backward direction by the force from the backward biasing member.

5. The dial controller as in claim 4,
   wherein the backward biasing member includes a resilient member that is disposed on an opposite side of the middle section along the rotation axis relative to the position indicator and a support base that supports the resilient member from an opposite side of the position indicator, and
   the resilient member in a space between the middle section and the support base is compressed by a displacement that is directly proportional to a stroke of the middle section in the forward direction.

6. The dial controller as in claim 4,
   wherein the displacement conversion mechanism is disposed on a second face side of the dial, and the displacement conversion mechanism is structured as a cam mechanism that includes:

a cam section that has a sliding cam surface in a spiral slope shape along a circumferential direction of the dial as the middle section; and a cam follower that slides along the sliding cam surface to move bi-directionally along the rotation axis of the dial in accordance with a normal rotation and a reverse rotation of the dial.

7. The dial controller as in claim 6, wherein the sliding cam surface is formed in a step shape as an alternative succession of a flat section and a slope section.

8. The dial controller as in claim 6 further comprising:

a dial holder for holding the dial at a predetermined angular position, wherein a plurality of the predetermined angular positions at respectively different predetermined angles around the rotation axis of the dial are defined for holding the dial.

9. The dial controller as in claim 8, wherein the sliding cam surface is formed as an alternative succession of a flat section and a slope section, and the predetermined angular position is defined as the predetermined angle that positions the cam follower on the flat section.

10. The dial controller as in claim 6, wherein the dial has a body in a cylinder shape, and the sliding cam surface is formed on an end face of the body.

11. A dial controller comprising:

a dial;

a displacement converter for converting a rotational displacement caused by a rotation operation of the dial to an axial displacement of the dial along a rotation axis of the dial;

a displacement detector for detecting and outputting information on a rotation angle of the dial based on a detection result of the axial displacement of the dial;

a position indicator being disposed separately from the dial in an axially movable manner along the rotation axis of the dial; and a displacement conversion mechanism for converting the rotational displacement caused by the rotation operation of the dial to the axial displacement of the position indicator along the rotation axis in a course of transmission thereof, wherein the displacement detector detects a position of the position indicator along the rotation axis of the dial, the displacement detector outputs the rotation angle of the dial based on the detection result of the position of the position indicator, the displacement conversion mechanism includes a middle section that moves bi-directionally in a forward and a backward direction along the rotation axis of the dial in accordance with the rotation operation of the dial in a normal and a reverse rotation direction, the dial has a first face on one axial end that is susceptible to an external operation and a second face on the other axial end that is opposite to the one axial end, the position indicator is pressed by a backward biasing member toward the middle section in the backward direction that is defined as a direction from the second face to the first face and an opposite direction of the forward direction, the position indicator is driven in the forward direction in accordance with a movement of the middle section against a force from the backward biasing member when the middle section moves in the forward direction, the position indicator is driven in the backward direction in accordance with the movement of the middle section when the middle section moves in the backward direction by the force from the backward biasing member, the displacement conversion mechanism is disposed on a second face side of the dial, the displacement conversion mechanism is structured as a cam mechanism that includes:

a cam section that has a sliding cam surface in a spiral slope shape along a circumferential direction of the dial as the middle section; and a cam follower that slides along the sliding cam surface to move bi-directionally along the rotation axis of the dial in accordance with a normal rotation and a reverse rotation of the dial, and further comprising:

a dial holder for holding the dial at a predetermined angular position, wherein a plurality of the predetermined angular positions at respectively different predetermined angles around the rotation axis of the dial are defined for holding the dial, the second face of the dial has a supplemental sliding surface that is formed separately from the sliding cam surface, the support base has a supplemental sliding member that faces the supplemental sliding surface in a sliding contact therewith at a predetermined angular position of the rotation axis when the dial is rotated, an end of the supplemental sliding member follows the supplemental sliding surface in a sliding contact therewith when the dial is rotated, the dial holder includes a convex position marker that protrudes from one of the supplemental sliding surface and the supplemental sliding member and a concave position marker that is fitted to the convex position marker on an other of the supplemental sliding surface and the supplemental sliding member, the convex position marker engages the concave position marker when the dial is positioned at the predetermined angular position, and the convex position marker disengages the concave position marker by resiliently going over an edge in a rotation direction of the dial when the dial is rotated.

12. The dial controller as in claim 11, wherein the supplemental sliding surface and the sliding cam surface are formed in at least partially overlapping angular areas at respectively different positions in a radial direction of the rotation axis.

13. The dial controller as in claim 12, wherein the sliding cam surface is formed in a step shape as an alternative succession of a flat section and a slope section, the supplemental sliding cam surface is formed in the step shape as the alternative succession of the flat section and the slope section that inclines toward an opposite direction of the slope section in the sliding cam surface, and the slope sections on the supplemental sliding cam surface are formed so that the predetermined angular position of the cam follower for contacting one of the slope sections on the sliding cam surface makes the supplemental cam follower contact one of the slope sections on the supplemental sliding cam surface.

14. The dial controller as in claim 13, wherein the concave position marker is formed on a flat section on the supplemental sliding cam surface.

15. The dial controller as in claim 11,
wherein the concave position marker is formed on the supplemental sliding surface,
the convex position marker is formed on the supplemental sliding member,
the support base has a supplemental resilient member that resiliently biases the convex position marker toward the concave position marker at the predetermined angular position, and
the convex position marker disengages the concave position marker by overcoming a force from the supplemental resilient member and slides on the supplemental sliding surface in the sliding contact therewith with the force from the supplemental resilient member applied thereto.

16. A dial controller comprising:
a dial;
a displacement converter for converting a rotational displacement caused by a rotation operation of the dial to an axial displacement of the dial along a rotation axis of the dial;
a displacement detector for detecting and outputting information on a rotation angle of the dial based on a detection result of the axial displacement of the dial;
a position indicator being disposed separately from the dial in an axially movable manner along the rotation axis of the dial; and
a displacement conversion mechanism for converting the rotational displacement caused by the rotation operation of the dial to the axial displacement of the position indicator along the rotation axis in a course of transmission thereof, wherein
the displacement detector detects a position of the position indicator along the rotation axis of the dial,
the displacement detector outputs the rotation angle of the dial based on the detection result of the position of the position indicator,
the displacement conversion mechanism includes a middle section that moves bi-directionally in a forward and a backward direction along the rotation axis of the dial in accordance with the rotation operation of the dial in a normal and a reverse rotation direction,
the dial has a first face on one axial end that is susceptible to an external operation and a second face on the other axial end that is opposite to the one axial end,
the position indicator is pressed by a backward biasing member toward the middle section in the backward direction that is defined as a direction from the second face to the first face and an opposite direction of the forward direction,
the position indicator is driven in the forward direction in accordance with a movement of the middle section against a force from the backward biasing member when the middle section moves in the forward direction,
the position indicator is driven in the backward direction in accordance with the movement of the middle section when the middle section moves in the backward direction by the force from the backward biasing member,
the displacement conversion mechanism is disposed on a second face side of the dial,
the displacement conversion mechanism is structured as a cam mechanism that includes:
a cam section that has a sliding cam surface in a spiral slope shape along a circumferential direction of the dial as the middle section; and
a cam follower that slides along the sliding cam surface to move bi-directionally along the rotation axis of the dial in accordance with a normal rotation and a reverse rotation of the dial,
the second face of the dial has a supplemental sliding surface that is formed separately from the sliding cam surface,
the support base has a supplemental sliding member that faces the supplemental sliding surface in a sliding contact therewith at a predetermined angular position of the rotation axis when the dial is rotated,
the supplemental sliding surface is formed as a supplemental sliding cam surface that has the spiral slope shape in an opposite direction relative to the spiral slope shape of the sliding cam surface,
the supplemental sliding member moves bi-directionally along the rotation axis of the dial in a reversed manner relative to the movement of the cam follower when the dial is rotated, and
a resilient member in the backward biasing member between the cam follower and the support base is compressed by a displacement that is directly proportional to a stroke of the cam follower in the forward direction, and
the supplemental sliding member between the supplemental cam follower and the support base is compressed by a displacement that is directly proportional to a stroke of the supplemental cam follower in the forward direction.

17. A dial controller comprising: a dial;
a displacement converter for converting a rotational displacement caused by a rotation operation of the dial to an axial displacement of the dial along a rotation axis of the dial;
a displacement detector for detecting and outputting information on a rotation angle of the dial based on a detection result of the axial displacement of the dial;
a position indicator being disposed separately from the dial in an axially movable manner along the rotation axis of the dial; and
a displacement conversion mechanism for converting the rotational displacement caused by the rotation operation of the dial to the axial displacement of the position indicator along the rotation axis in a course of transmission thereof, wherein
the displacement detector detects a position of the position indicator along the rotation axis of the dial,
the displacement detector outputs the rotation angle of the dial based on the detection result of the position of the position indicator,
the displacement conversion mechanism includes a middle section that moves bi-directionally in a forward and a backward direction along the rotation axis of the dial in accordance with the rotation operation of the dial in a normal and a reverse rotation direction,
the dial has a first face on one axial end that is susceptible to an external operation and a second face on the other axial end that is opposite to the one axial end,
the position indicator is pressed by a backward biasing member toward the middle section in the backward direction that is defined as a direction from the second face to the first face and an opposite direction of the forward direction,
the position indicator is driven in the forward direction in accordance with a movement of the middle section against a force from the backward biasing member when the middle section moves in the forward direction,
the position indicator is driven in the backward direction in accordance with the movement of the middle section when the middle section moves in the backward direction by the force from the backward biasing member, the displacement conversion mechanism is disposed on a second face side of the dial, the displacement conversion mechanism is structured as a cam mechanism that includes:

a cam section that has a sliding cam surface in a spiral slope shape along a circumferential direction of the dial as the middle section; and a cam follower that slides along the sliding cam surface to move bi-directionally along the rotation axis of the dial in accordance with a normal rotation and a reverse rotation of the dial, the dial has a body in a cylinder shape, and the sliding cam surface is formed on an end face of the body, the body is concentrically and coveringly disposed over a rotation supporting convex portion that is protrudingly disposed on a front side of a case, a proximity of a base position of the rotation supporting convex portion on an instrument panel has a circular depression for hiding the cam mechanism on the second face side of the body, and the cam follower protrudes from a bottom surface of the circular depression.

18. The dial controller as in claim 17, wherein the second face of the dial has a supplemental sliding surface that is formed separately from the sliding cam surface, the support base has a supplemental sliding member that faces the supplemental sliding surface in a sliding contact therewith at a predetermined angular position of the rotation axis when the dial is rotated, an end of the supplemental sliding member follows the supplemental sliding surface in a sliding contact therewith when the dial is rotated;

a cylindrical installation support unit is arranged in an inwardly-detached manner from an inner circumferential surface of the body in a radial direction, a connecting rib for connecting an outer circumferential surface of the cylindrical installation support unit and the inner circumferential surface of the body on a second face side in a resilient manner that allows a resilient displacement of a first end of the cylindrical installation support unit is formed in a circumferential direction, an outer circumferential surface of the rotation support convex portion has a convex retainer for retaining the cylindrical installation support unit from falling at a position that corresponds to the first end of the cylindrical installation support unit, and the supplemental sliding surface is formed on the second face side of the connecting rib.

19. A dial controller comprising:

a dial;

a displacement converter for converting a rotational displacement caused by a rotation operation of the dial to an axial displacement of the dial along a rotation axis of the dial;

a displacement detector for detecting and outputting information on a rotation angle of the dial based on a detection result of the axial displacement of the dial;

a position indicator being disposed separately from the dial in an axially movable manner along the rotation axis of the dial; and a displacement conversion mechanism for converting the rotational displacement caused by the rotation operation of the dial to the axial displacement of the position indicator along the rotation axis in a course of transmission thereof, wherein the displacement detector detects a position of the position indicator along the rotation axis of the dial, the displacement detector outputs the rotation angle of the dial based on the detection result of the position of the position indicator, the displacement conversion mechanism includes a middle section that moves bi-directionally in a forward and a backward direction along the rotation axis of the dial in accordance with the rotation operation of the dial in a normal and a reverse rotation direction, the dial has a first face on one axial end that is susceptible to an external operation and a second face on the other axial end that is opposite to the one axial end, the position indicator is pressed by a backward biasing member toward the middle section in the backward direction that is defined as a direction from the second face to the first face and an opposite direction of the forward direction, the position indicator is driven in the forward direction in accordance with a movement of the middle section against a force from the backward biasing member when the middle section moves in the forward direction, and the position indicator is driven in the backward direction in accordance with the movement of the middle section when the middle section moves in the backward direction by the force from the backward biasing member, and further comprising:

a first gear that is concentrically disposed on the dial for being integrally rotated with the dial;

a second gear that engages the first gear in an axially slidable manner bi-directionally along the rotation axis of the dial;

a male screw member that protrudes from a second face of the second gear in an axial direction of the dial for being integrally rotated with the dial; and a female screw member that is positioned stationary in terms of the axial direction of the dial for being threaded with the male screw member, wherein the male screw member threads the female screw member from a first side of the female screw member, and wherein a second end of the male screw member protrudes from a second side of the female screw member, wherein the first side of the female screw member is identically oriented with the first face of the dial, the second face of the second gear, the second end of the male screw member, and the second side of the female screw member are identically oriented with the second face of the dial, and the male screw member is formed as the middle section.

* * * * *